United States Patent [19]

Powell

[11] 4,383,507
[45] May 17, 1983

[54] COLD STARTING SYSTEM FOR ALCOHOL FUELED ENGINE

[75] Inventor: Thomas M. Powell, Rochester, Mich.

[73] Assignee: General Motors Corporation, Detroit, Mich.

[21] Appl. No.: 251,486

[22] Filed: Apr. 6, 1981

[51] Int. Cl.³ .............................................. F02M 31/12
[52] U.S. Cl. ..................... 123/179 H; 123/180 AC; 123/180 E; 123/549; 261/142
[58] Field of Search ....... 123/179 H, 179 G, 180 AC, 123/180 R, 180 E, 187.5 R, 549, 1 A; 261/142

[56] References Cited

U.S. PATENT DOCUMENTS

| | | | |
|---|---|---|---|
| 1,147,416 | 7/1915 | Macdonald | 123/179 G |
| 1,301,869 | 4/1919 | Oberreich | 123/180 E |
| 1,603,660 | 10/1926 | Cassella | 123/549 |
| 3,448,733 | 6/1969 | Aske | 123/180 R |
| 3,792,688 | 2/1974 | Grainger | 123/549 |
| 4,123,997 | 11/1978 | Oswald et al. | 123/180 AC |

*Primary Examiner*—Charles J. Myhre
*Assistant Examiner*—Andrew M. Dolinar
*Attorney, Agent, or Firm*—C. K. Veenstra

[57] ABSTRACT

To start an ethanol fueled engine at low temperatures, a pump sprays liquid ethanol into a PTC thermistor grid disposed in a vaporizer. The electric grid evaporates the liquid ethanol to provide sufficient ethanol vapor to start the engine.

1 Claim, 2 Drawing Figures

COLD STARTING SYSTEM FOR ALCOHOL FUELED ENGINE

TECHNICAL FIELD

This invention relates to systems for starting alcohol fueled engines at low temperatures.

BACKGROUND

Engines fueled with alcohol have proven difficult to start at temperatures less than about 15° C. because at low temperatures alcohol does not produce sufficient vapor to support combustion. The current practice in starting alcohol fueled engines at low temperatures is to discharge a quantity of gasoline into the engine induction system; a fraction of the gasoline evaporates sufficiently to start the engine, and the resulting increase in engine temperature is sufficient to thereafter sustain operation on alcohol.

SUMMARY OF THE INVENTION

This invention provides a system for starting an alcohol fueled engine at low temperatures without adding a second fuel such as gasoline.

In this system, a vaporizer is charged with a quantity of liquid ethanol when the engine is stopped. Then, when subsequently starting the engine at low temperatures, the liquid ethanol in the vaporizer is pumped through a spray nozzle into a heating grid, and the ethanol vapor which is generated is conducted to the engine induction system to provide sufficient ethanol vapor to start the engine.

The details as well as other features and advantages of this invention are set forth in the remainder of the specification and are shown in the accompanying drawings.

BEST MODE FOR CARRYING OUT THE INVENTION

Figure 1:
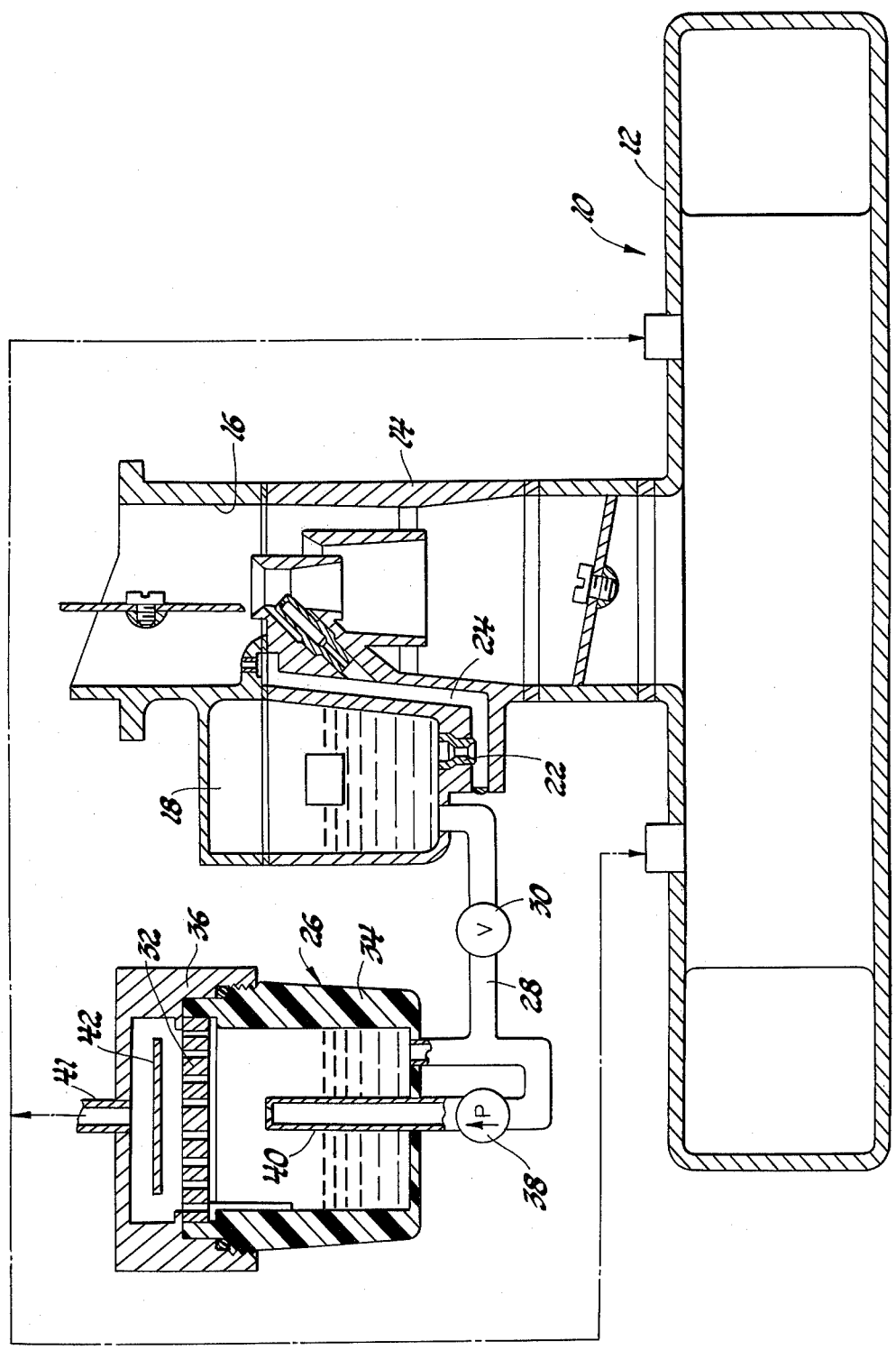
FIG. 1 is a schematic view of an engine induction system with a cold starting system according to this invention.

Referring first to FIG. 1, an engine 10 has an induction system including an intake manifold 12 and a carburetor 14 which together define an induction passage 16 for air flow to the engine. Carburetor 14 includes a fuel bowl 18 containing liquid ethanol; fuel bowl 18 discharges liquid ethanol in a conventional manner through a metering orifice 22 and a fuel passage 24 leading to induction passage 16 where the liquid ethanol is mixed with the air flow to provide an air-fuel mixture for combustion in the engine.

An ethanol vaporizer 26 has an inlet 28 connected through a valve 30 to receive liquid ethanol from carburetor fuel bowl 18. Vaporizer 26 includes a heating grid 32 secured between a bowl 34 and a cover 36. Grid 32 is formed of a positive temperature coefficient (PTC) thermistor material which is connected in an electric circuit; the PTC thermistor material limits current through grid 32 to maintain grid 32 at substantially constant temperature suitable for evaporating liquid ethanol.

In operation, a pump 38 draws liquid ethanol from bowl 34 and sprays the liquid upwardly through a nozzle 40 at grid 32. Grid 32 evaporates a portion of the liquid spray to create a supply of ethanol vapor which is delivered through a duct 41 to intake manifold 12 to provide sufficient ethanol vapor to start the engine. The portion of the liquid spray which is not evaporated falls back into bowl 34, and a baffle 42 assures that liquid ethanol is not sprayed into duct 41.

Figure 2:
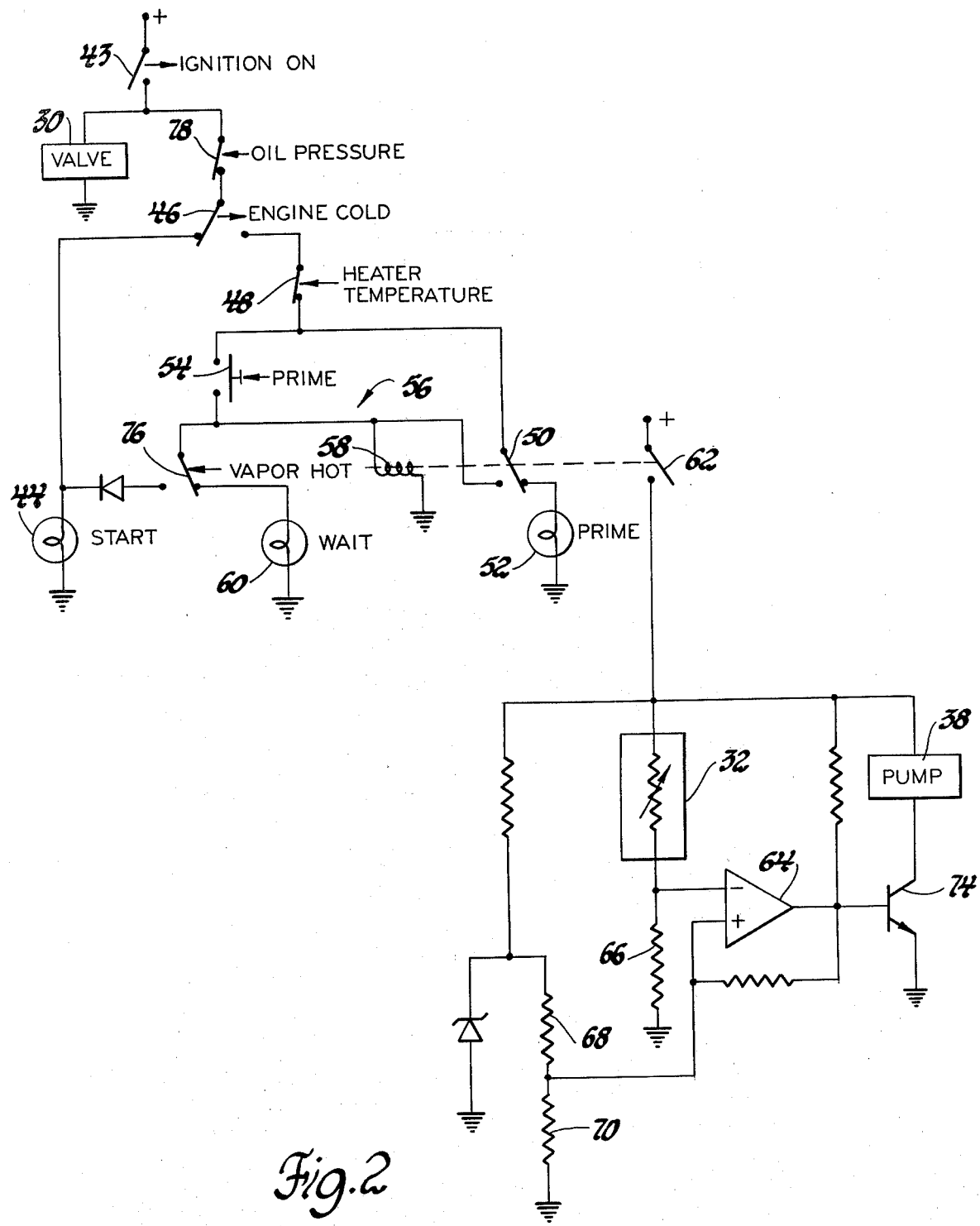
FIG. 2 schematically illustrates a control circuit which may be used with this invention.

The operation of this cold starting system may be understood by reference to FIG. 2. When it is desired to start engine 10, an ignition switch 43 is closed and valve 30 is thereby closed to trap a supply of liquid ethanol in vaporizer 26. If the engine is at a temperature suitable for starting without special provisions, a light 44 informs the operator that engine 10 may be started immediately. However, if the engine is at a temperature which requires special starting provisions, a switch 46 is moved rightwardly and makes a circuit through switches 48 and 50, and a light 52 thereupon instructs the operator to prime the engine. When the operator closes a prime switch 54, a parallel network 56 including a holding relay 58 is energized to move switch 50 leftwardly, thereby extinguishing prime light 52 while closing another circuit to network 56. Within network 56, another light 60 instructs the operator to "wait", while a switch 62 is closed to energize heating grid 32. The resistance of grid 32 increases with temperature and is measured by a comparator 64 against the resistance of other resistive elements 66, 68 and 70. When the resistance of heating grid 32 increases to a level indicating that grid 32 is hot enough to vaporize liquid ethanol, comparator 64 causes a transistor 74 to conduct and turns on pump 38.

Ethanol vapor is generated in vaporizer 26 as pump 38 sprays liquid ethanol into grid 32. When the temperature in vaporizer 26 indicates that sufficient ethanol vapor has been generated to start the engine, a switch 76 is moved leftwardly to extinguish "wait" light 60 and cause light 44 to inform the operator that engine 10 may be started.

Once the engine has started, the resulting increase in engine oil pressure moves a switch 78 leftwardly to deenergize the cold starting circuit.

It will be appreciated that this invention may be employed in a variety of other embodiments within the scope of the following claim.

The embodiments of the invention in which an exclusive property or privilege is claimed are defined as follows:

1. A cold starting system for an engine having a carburetor for mixing liquid alcohol with air to form an air-fuel mixture and having an induction passage for conducting said mixture to the engine, said carburetor including a fuel bowl containing liquid alcohol, said system comprising:

a vaporizer chamber having a connection to said fuel bowl for receiving a quantity of liquid alcohol therefrom and a valve in said connection operable to trap a supply of liquid alcohol in said chamber, a heating element disposed in said chamber above the liquid alcohol, said element comprising a grid having a plurality of surfaces, said grid being connected in an electric circuit and formed of a positive temperature coefficient thermistor material which limits current through said grid to maintain said grid at a substantially constant temperature effective for evaporating liquid alcohol, a pump actuable for drawing liquid alcohol from the lower portion of said chamber and for spraying such alcohol upon said grid, whereby liquid alcohol discharged from the lower surface of said grid is redirected to said grid, means effective prior to starting the engine at engine temperatures below a selected value for operating said valve to trap liquid alcohol in said chamber, for actuating said pump to spray liquid alcohol upon said heating element grid, and for directing current through said circuit to said heating element grid whereby a quantity of alcohol vapor may be provided in said vaporizer chamber, and a vapor duct for conducting alcohol vapor from said vaporizer chamber to said induction passage, thereby providing sufficient alcohol vapor to start the engine, and baffling means above said grid to inhibit passage of liquid alcohol from said vaporizer chamber to said induction passage, whereby liquid alcohol discharged from the upper surface of said grid is redirected to said grid.

* * * * *